Nov. 11, 1952 G. H. LEONARD 2,617,655

RECORD CHANGER

Filed June 3, 1948 3 Sheets-Sheet 1

Inventor
GEORGE H. LEONARD

By

Blair, Curtis & Hayward
Attorneys

Nov. 11, 1952 G. H. LEONARD 2,617,655

RECORD CHANGER

Filed June 3, 1948 3 Sheets-Sheet 2

Inventor

GEORGE H. LEONARD

By

Blair, Curtis & Hayward

Attorneys

Nov. 11, 1952 G. H. LEONARD 2,617,655

RECORD CHANGER

Filed June 3, 1948 3 Sheets-Sheet 3

Inventor

GEORGE H. LEONARD

By Blair, Curtis & Hayward

Attorneys

Patented Nov. 11, 1952

2,617,655

UNITED STATES PATENT OFFICE 2,617,655

RECORD CHANGER

George H. Leonard, Darien, Conn., assignor to C. G. S. Laboratories, Inc., Stamford, Conn.

Application June 3, 1948, Serial No. 30,865

6 Claims. (Cl. 274—10)

This invention relates to phonograph record players for reproducing recorded sound signals. More particularly it relates to improved methods and apparatus for changing records so that a series of records may be played automatically and in succession.

Such automatic record changers are desirable so that a number of records may be played without the necessity for manual manipulation by the operator in order to transfer the playing mechanism from one record to the next. Many types of automatic record changers have been developed, but only the most expensive of those now produced commercially, handle the records in such manner as to minimize likelihood of damage to the records. Such record changers, in addition to the high initial cost, employ complicated mechanisms which are difficult to service and require careful adjustment in order to obtain the best performance. Some efforts to reduce the complexity of the mechanism and lower the cost have resulted in over-simplification with the result that only records within relatively narrow dimensional limits can be used.

One type of record changer now in use employs a center spindle on which the records are stacked and held in position above the turntable by an offset or shoulder on the spindle. The records are released one at a time by pushing the lowermost record over this offset or shoulder. Such a system has several undesirable characteristics. For example, the entire record stack is supported or restrained by the lowermost record at the time of its release, and because of the release system the edges of the center holes are worn in some cases so much that the records can no longer be changed automatically. Moreover, the following records tend to strike the turntable at an angle resulting in excessive noise and possible damage to the sound track of a record already upon the turntable.

Another type of record changer employs a "slicer" mechanism in which the records are supported at or near the edge and caused to drop by gradually moving the supports laterally from beneath the lowermost record, while the upper records are supported by a thin "slicer" arm. Such mechanisms have many disadvantages; for example, the two (or more) record supporting devices ordinarily do not release the record at exactly the same instant and, therefore, the record does not fall flat upon the turntable. In addition, the position of the record supporting surfaces at the perimeter of the record necessitates a larger space for accommodating the record playing equipment. Both types of record changers usually must be adjusted manually to change from records of one diameter to another. To adapt these changers to play intermixed records of different diameters requires relatively complicated and expensive mechanical structures. Furthermore, many of these changers will jam or damage the records if warped records or records which are too thick or too thin are placed on the changer.

A third type of changer, the "spindle changer," in which the record changing mechanism is associated with the center spindle, has many inherent advantages over the above types, but because of other disadvantages associated with present day spindle type changers, they have not been completely successful. For example, clamping mechanisms likely to damage the center hole of the records have been employed, and in many instances, the entire record stack is supported during part of the cycle by applying the gripping or supporting force at the center hole of a single record. During another part of the cycle, the records rest upon supporting shoulders or projections from the center spindle which are in contact with only a very small area of the lower surface of the lowermost record immediately adjacent the center hole. Thus, during both parts of the cycle the record supporting method is such as is likely to damage or abrade the records. Also, as pointed out above, the record release mechanisms are such that the records do not always fall flat upon the turntable. Further trouble may be experienced with records having burrs or labels which are rough or wrinkled adjacent the center hole where the records are supported.

Thus, it is apparent that present day record changers have many disadvantages including the possibility of damaging the records by chipping or breaking or by defacing the sound grooves on the records, or by rapid wearing of the center hole.

Moreover, the noise created either by the record changing mechanism or by the noise of a falling record striking, at an angle, a record already upon the turntable is annoying. In addition, mechanisms for handling records of various sizes, particularly when these records are intermixed, that is, when two sizes of records are contained within the same group are complicated and thus are reserved for use only in more expensive record changers.

In accordance with the present invention, a record changer is provided which handles the records in such manner as to preclude damage to the records, operates independently of record diameter, will handle warped or eccentric records, provides for easy and rapid record removal or replacement, may be readily adapted to "mixer" type operation, and overcomes many other defects and disadvantages of present day record changers.

An object of this invention is to provide methods and apparatus for releasing a phonograph record by moving the record supporting medium downwardly with an initial acceleration greater than the gravitational acceleration of the record, and moving the medium out of the path of the falling record.

It is another object of this invention to provide an improved spindle type record changing mechanism in which the entire record handling mechanism is operated from the center spindle, and in which the record to be played is supported solely at spaced points intermediate the perimeter and the center hole of the record.

Another object of this invention is to provide an improved energy-storage trigger-release mechanism for operating the record dropping mechanism.

Still another object is to provide an improved spring tension release arrangement for removing normal spring forces during the period when a record is being released thereby to prolong the life of the changer and to increase the reliability of operation.

Another object is to provide a record dropping mechanism whereby each record is dropped flat upon the turntable, thus reducing the possibility of record damage and minimizing the noise caused by changing records.

It is a further object to provide such a record changer in which the records may be removed or replaced easily and quickly on the center spindle without the necessity for manipulating the records in a critical or skilled manner and without likelihood of damaging the records.

Another object is to provide such a record changer which may be readily adapted to various types of record players already in commercial use and which may be adapted with particular advantage to the playing of intermixed records and to use in coin-operated record machines of the so-called "juke" box type.

Still another object is to provide an improved arrangement for gently but securely supporting and holding the record stack during mid-cycle.

A further object is to provide such an arrangement in which the force supporting the record stack is distributed over several records.

Still another object is to provide such an arrangement in which the record gripping media is a specially shaped ring or sleeve of rubber-like material.

These and other objects will be in part obvious and in part pointed out in the following detailed description of an embodiment of the invention. Although it is to be understood that this description relates to a preferred embodiment of the invention suitable for commercial production without substantial modification, it is to be made clear also that various modifications may be made as are deemed desirable or necessary in accordance with the particular application; and, accordingly, many types of record changers may be constructed utilizing the methods and principles set forth below. It is to be pointed out also that certain novel arrangements or features of this embodiment may be employed to advantage in many applications without a corresponding use of other features.

In the accompanying drawings, in which similar numerals refer to similar parts throughout the several views:

Figs. 1, 2, and 3 are elevational views of the record changing mechanism, shown in substantially typical proportions, at three different times during the operating cycle;

Figure 1:
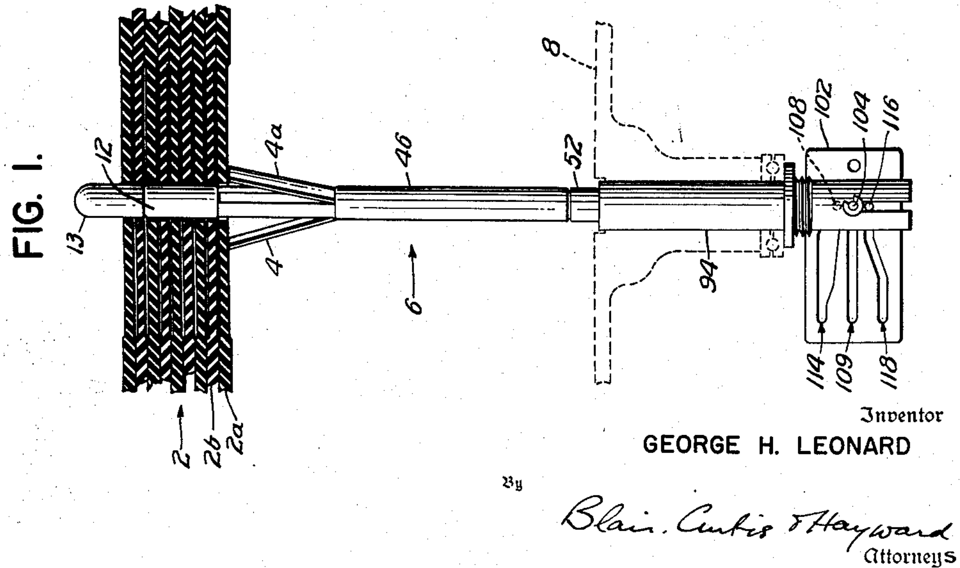

In order to provide initial support for the records, generally indicated at 2 (Fig. 1), that are to be played successively, three spaced movable arms 4, 4A and 4B, are supported by and extend upwardly and outwardly from a center spindle, generally indicated at 6. The records are placed over the upper portion of this spindle 6 with the stack of records 2 supported by the lowermost record *2a* which, in turn, rests upon the upper ends of the three arms 4, as shown in Fig. 1.

From this position the records are caused to drop one by one, the first record upon the surface of a turntable 8 and the successive records one on top of the other above the turntable; the records being played successively in the usual manner. The mechanism for playing the records, controlling the pickup arm, and driving the turntable are not shown, because such features form no part of this invention and are well known already.

To support the remainder of the records while the lowermost record *2a* is permitted to fall freely to the turntable, an expandable gripping ring of relatively soft material, for example, rubber, is positioned just below a top cap 13 of the spindle and is surrounded by the records that are just above the lowermost record, which is below the ring 12 and is supported by the arms 4.

Figures 3, 4, 5:
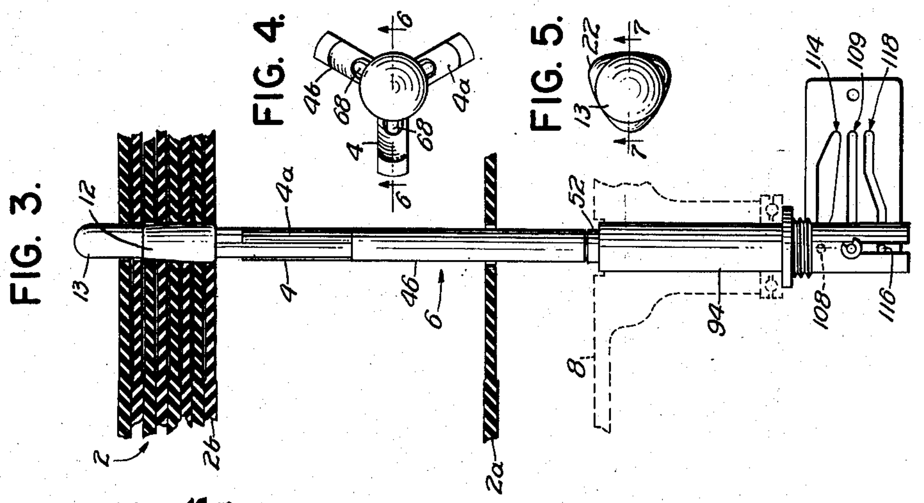
Figs. 4 and 5 are enlarged plan views of the spindle showing the record supporting arms extended and retracted, respectively.
Figure 2:
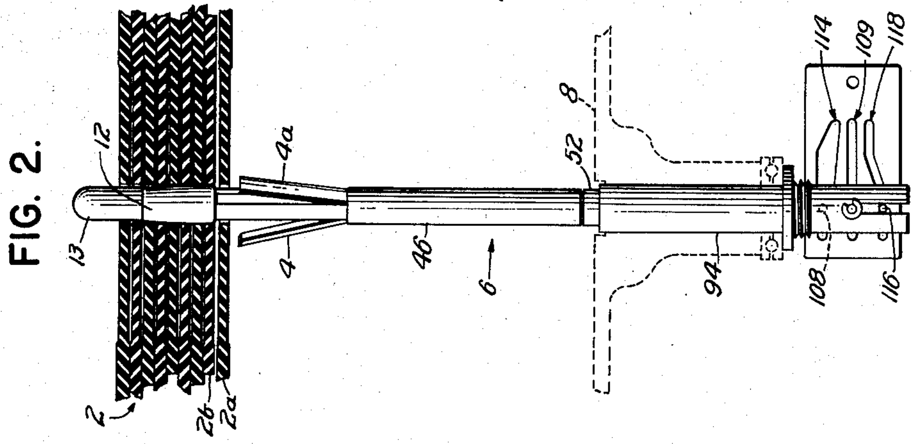

In order to expand the resilient ring 12 to grip and support the record stack as shown in Figs. 2 and 5, three spaced expander pins 14, *14a* and *14b* (Figs. 6, 7, 9) are mounted within the ring and are arranged to be forced outwardly by a tapered end section 16 of an actuating rod 18 which extends vertically upwardly within the spindle 6. Thus, when the actuating rod 18 is moved upwardly the expander pins 14 are forced outwardly by the increasing diameter of the adjacent section of the actuating rod, causing the gripping ring 12 to stretch or expand outwardly to grip firmly the records 2. Advantageously, this gripping action is effective on more than one of the records and has been found to operate with excellent results when the gripping force is applied to at least three of the records adjacent the lowermost record, in which manner a large number of records may be supported securely without necessity for applying an excessive force againt the walls of the center holes of the records.

If the rubber gripping ring 12 is designed improperly the records may not be securely gripped, the rubber may wear too rapidly or more force than is desirable may be required to stretch the rubber ring sufficiently to grip the records. Accordingly, it is of importance that some care be given to the design and construction of the rubber gripping ring. In order to provide these desirable features, the ring 12 has been formed, for example, by molding, to the shape shown most clearly in Fig. 9, wherein the wall sections are provided with three relatively thick sections 22 connected by three intervening thinner sections 24. The expander pins 14 are positioned adjacent the thicker wall sections 22 and, thus, move these portions outwardly while causing the thinner portions 24 of the wall to stretch. The outer edges at the ends of the rubber gripping ring are rounded smoothly, as at 26 (Fig. 6), while the inner edges form relatively sharp corners, as at 28. To maintain the ring in position and prevent distortion by the downward force of the records, inwardly extending lips 32 are provided on the thinner wall sections 24 at the upper and lower ends and are arranged to fit into corresponding groove sections 34 in an upper spindle 36 (see Fig. 9). These lips serve to reinforce the rubber gripping ring 12 and to lock it firmly in position on the upper spindle. With this arrangement the rubber gripping ring retains its shape over a long period of time. The application of the expanding force in the same direction as the direction of ring expansion causes the ring to apply ample gripping force to the records regardless of the number of records to be supported.

With the upper records, thus, securely gripped by the expanded rubber ring 12, the lowermost record 2a may be released by the supporting arms. This is accomplished by moving the arms 4 downwardly and inwardly into suitable recesses provided in the spindle 6.

In order that the arms may be free of the record surface as they are moved inwardly toward the spindle and, thus, avoid scraping or wearing action, the initial acceleration of the arms is directly downward in direction and is greater than the gravitational acceleration of the now freely falling record. Thus, in effect, the record 2a is left unsupported in space, as shown in Fig. 2 and the arms 4 are moved downwardly and inwardly in such a short period of time that they are recessed almost instantly within the center spindle, (Fig. 3) so that the falling record does not again make contact with them. The record, which is released suddenly and in a plane parallel to the surface of the turntable 8, thus continues its descent and falls gently upon the turntable in position to be played. By causing the record to fall in a flat position, a cushioning action occurs as it reaches the turntable caused by the relatively large volume of air which must be displaced.

The arms 4 are subsequently released and caused to assume their initial outwardly extending position, at which time the actuating rod is moved downwardly, causing the remaining stack of records to be supported again by the arms 4. The actuating rod subsequently moves upwardly so that the gripping ring again holds or grips the records which are immediately above the second record 2b, which is now the lowermost record of the stack. The mechanism is now ready to repeat the cycle by releasing this record when the sound has been reproduced from the first record 2a.

The movable arms 4 may be constructed by relatively inexpensive forging or stamping operations, or may be precision cast, and may assume a variety of shapes and forms depending upon the exact details of associated components. In this particular embodiment, the outer and inner surfaces of the arms 4 are generally arcuate in horizontal cross section (Fig. 9), so that the inner surfaces are substantially complementary to the cylindrical surfaces against which they rest when in the closed position, and the outer surfaces have the same radii of curvature as the center openings of the records. The surface of the upper end of each arm forms an angle such that, when the arms are extended, this surface is horizontal to provide maximum surface area for supporting the record. A portion 44 of the inner surface of each arm near the bottom is tapered so that this surface is substantially vertical when the arms are in the extended position.

In order to secure the arms 4 in position, and provide a pivot about which the arms may rotate betwen the open and closed positions, a notch 38 is provided in the outer surface near the lower end of each arm. Into this notch 38 is fitted an inwardly extending lip or flange 42 on the upper end of a generally tubular arm-carrier sleeve 46.

In order to carry the arms 4 downwardly, the arm-carrier sleeve 46, which is connected by a threaded section 48 to a trigger ring 52, is moved downwardly. This simultaneous downward movement of the arms 4 and the arm-carrier sleeve 46 causes the tapered portion 44 of the arms 4 to abut against a second tapered surface 54 formed at the lower end of three equally spaced slots 56 in the upper spindle 36 (see also Fig. 9). The abutment of these coadjuvant surfaces causes the arms 4 to retract inwardly, and assume a substantially vertical position, this movement taking place when the arms 4 have reached substantially the termination of their downward movement.

Figures 6, 7:
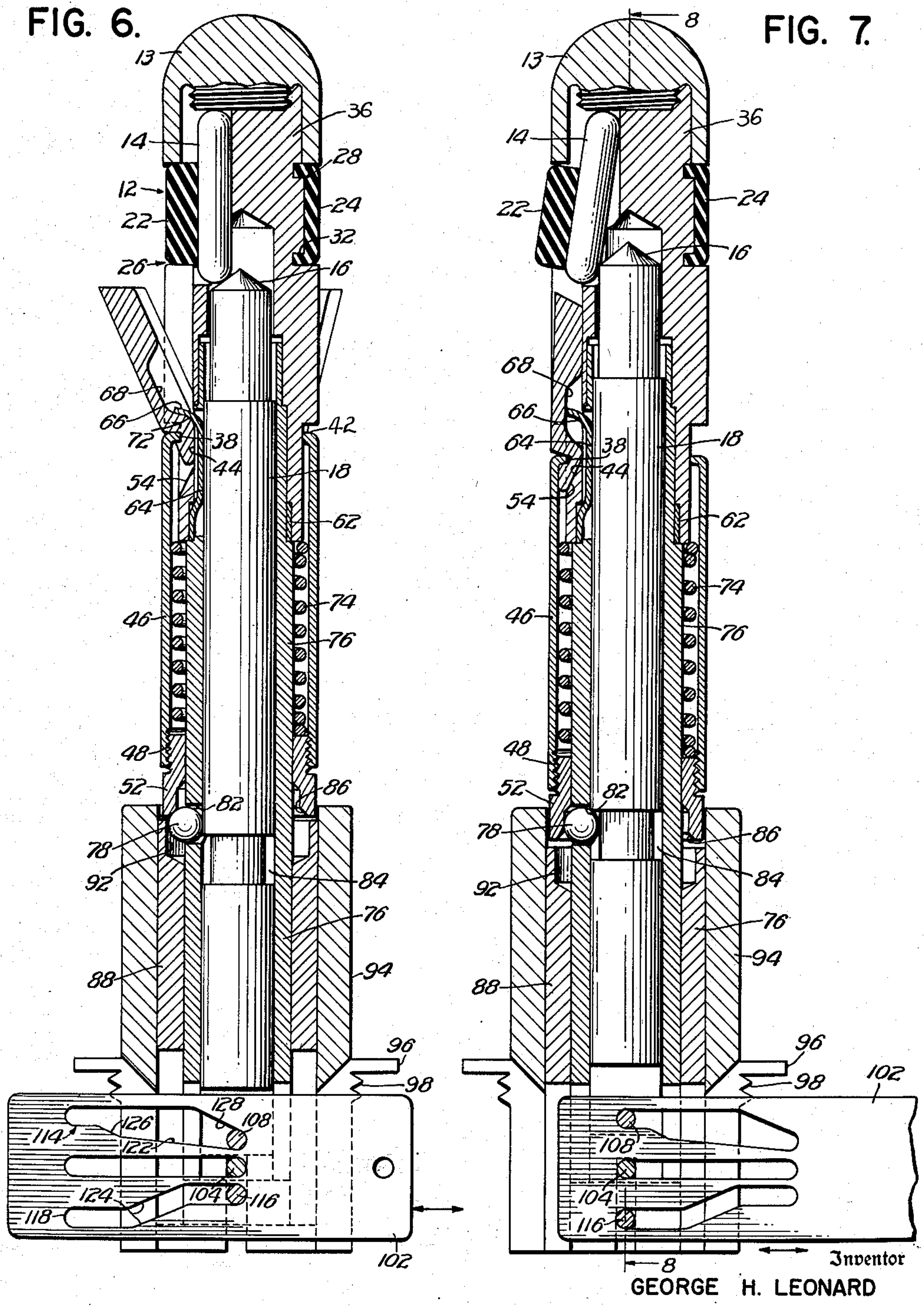
Fig. 6 is a sectional view taken on line 6—6 of Fig. 4 with the relative horizontal and vertical dimensions enlarged without record for true proportions in order to more clearly illustrate the construction and principles.
Fig. 7 is a similar view taken along line 7—7 of Fig. 5.

The arms are biased slightly toward the extended position, as shown in Fig. 6, by an arm spreading spring 58 (Fig. 9) which, for example, may be phosphor bronze or other spring material. A ring portion 62, which surrounds a portion of the actuating rod 18 (Fig. 6), supports three equally spaced spring levers 64, 64a, and 64b which extend upwardly from the ring portion 62, each spring lever being provided with an outwardly curved end portion 66. The spring levers 64 are biased inwardly by the ring portion 62 and it is the curved end portions 66 that exert the extending force on the arms. The upper end of each spring lever 64 rests against the inner surface of one of the arms 4 and exerts a slight biasing force sufficient to maintain the arms in the extended position when no appreciable opposing force is present.

A recessed portion 68 is provided in the inner surface of each arm, and it is into these recessed portions that the ends of the spring levers 64 extend when the arms 4 are in their retracted positions. With this arrangement the biasing force of the springs is effective only when the arms are in the upper position where the end portions of the spring levers make contact with the sloping edge 72 of the recessed portion 68.

In order to move the arms downwardly with sufficient acceleration that they can be recessed completely within the slots in the upper spindle portion before the freely falling record reaches the vertical position of the arms, the downward movement of the arm-carrier sleeve 46 must be relatively fast. Such a motion may be difficult to provide directly from the turntable driving mechanism and, accordingly, a triggering and ball-release arrangement is provided so that energy stored over a longer period of time may be utilized to achieve the desired rapid triggering action. In this embodiment, a coil spring 74, surrounding the center portion of a generally tubular lower spindle 76 is placed in compression between the upper end of the trigger ring 52 and the lower end of the upper spindle 36. The upper end of the lower spindle is press fitted into the upper spindle portion so that relative motion between the upper and lower spindle portions is prevented. The compression spring 74, therefore, urges downwardly the assembly including the trigger ring 52, the arm carrier sleeve 46, and the record support arms 4. Such downward movement is prevented, initially, by three balls 78 retained in three equally spaced holes 82 in the lower spindle 76. The inner surfaces of the balls 78 rest against the adjacent surface of the actuating rod 18 and the outer surfaces protrude beyond the circumference of the lower end of the trigger ring 52 and, thus, prevent downward movement of the arms 4 so long as the balls occupy these positions.

In order to release the trigger ring 52 and permit the compression spring 74 to move the arm assembly downwardly, a circular groove 84 is provided in the actuating rod 18 so that as the rod is moved upwardly to force the gripping ring 12 outwardly to hold the records, the balls 78 are forced inwardly, by the internal chamfer 86 on the lower end of the trigger ring 52, into the groove which is of sufficient depth that when the groove 84 and the holes 82 in the lower spindle 76 are adjacent, the balls 78 do not interfere with the movement of the trigger ring 52. Thus, the inward movement of the balls 78 releases the lower end of the trigger ring 52 which is forced downwardly by the compression spring 74 causing simultaneous downward movement of the arm-carrier sleeve 46 and the record supporting arms 4. With the abutment of the tapered surfaces 44 and 54 of the arms 4 and of the upper spindle 36, respectively, the arms 4 are caused to retract rapidly into their respective grooves in the spindle assembly.

Figure 9:
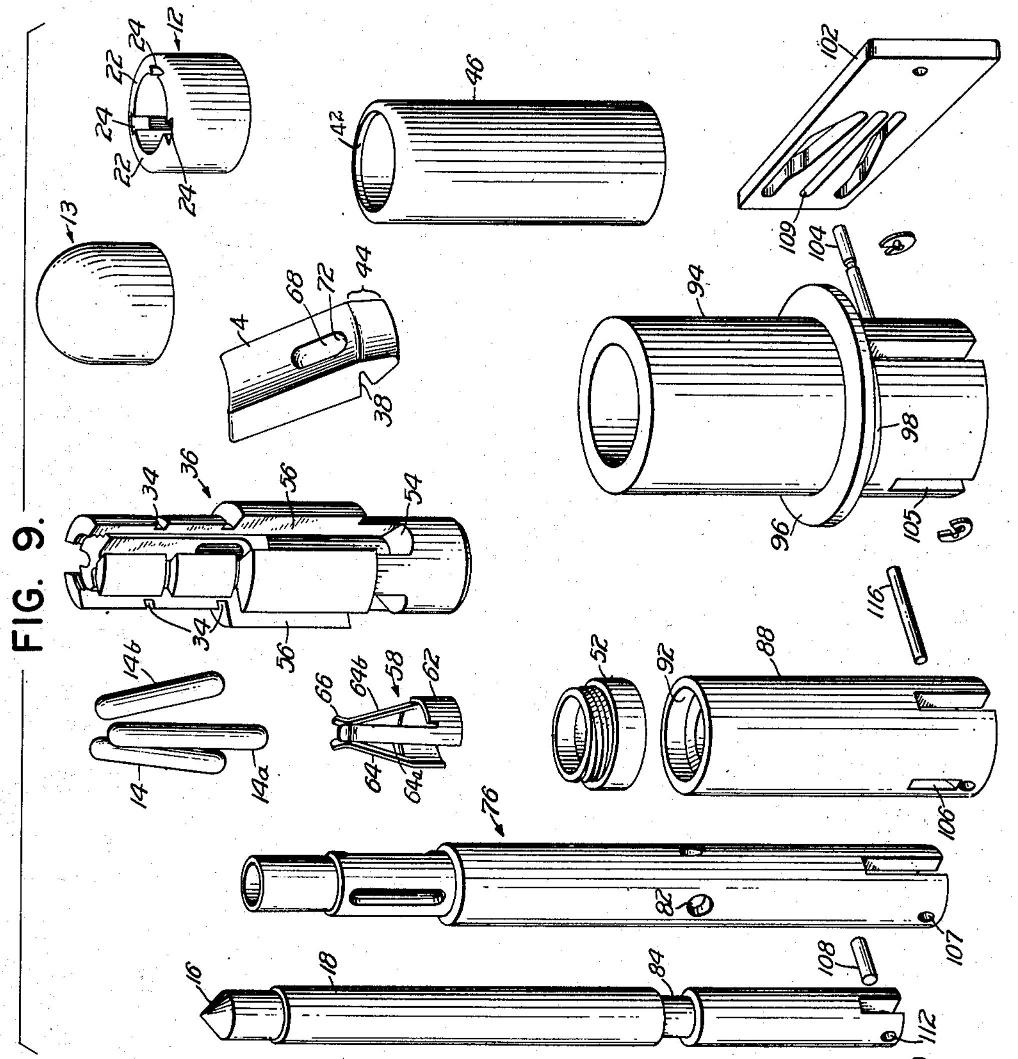
Fig. 9 is an exploded view showing, in perspective, the important component parts of the spindle with the various dimensions exaggerated as in the previous figures.
Figure 8:
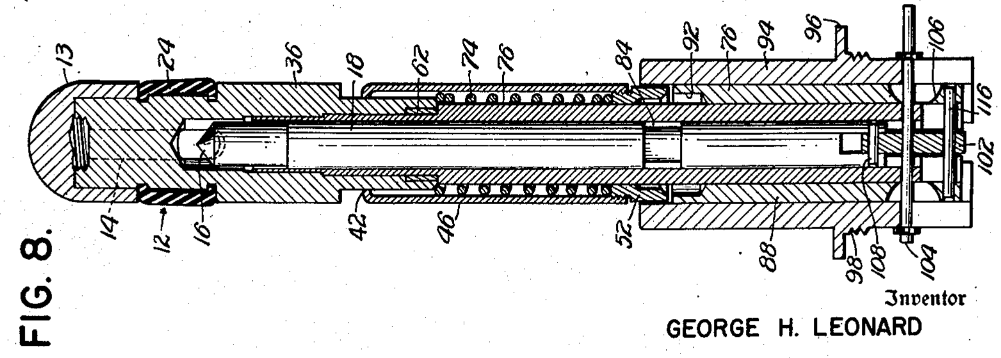
Fig. 8 is a sectional view taken along line 8—8 of Fig. 7 with somewhat different exaggeration of horizontal dimensions.

In order to reset the arms 4 in the extended position, the trigger ring 52 is pushed upwardly against the force of the compression spring 74 by an arm-reset sleeve 88 (Figs. 6 and 9). In order that the actuating rod 18 may be moved vertically and force the balls out of the groove 84 when the spring has been reset, the upper end of the arm-reset sleeve 88 is provided with an enlarged internal opening 92, which results in a thinner wall allowing ample room for the protruding balls 78. Thus, when the trigger ring 52 has been moved upwardly to the position shown in Fig. 6 the actuating rod 18 may be moved downwardly to lock the arms 4 in the extended position ready to be released or triggered during the subsequent cycle.

In order to support the spindle on the frame of the record player, a turntable hub 94, which surrounds a portion of the arm-reset sleeve 88, is provided having a shoulder 96 and threaded portion 98 for securing the hub to the frame in any desired manner.

In order to actuate the various parts of the spindle and ensure proper time and sequence relationsships during the cycle, the operating movements advantageously are derived from a single oscillating master cam member 102. This master cam is given a generally horizontal reciprocating motion by an eccentric or other drive mechanism (not shown) which desirably is driven by the same motor that drives the turntable 8, the reciprocating motion being synchronized with the mechanism that automatically operates the pick-up arm (not shown). It will be apparent to those familiar with the construction of record changers that the desired reciprocating motion can be obtained readily from almost any conventional phonograph drive mechanism. For example, the spindle may be inserted easily in a Webster Model 156 Changer, by attaching an eccentric drive to the changer mechanism for providing the desired synchronized push-pull motion.

An alignment pin 104 extends transversely through slots 105 in the lower portion of the hub 94, through vertical slots 106 in opposite sides of the arm-reset sleeve 88, through holes 107 in the lower spindle 76, and through a linear slot 109 in the master cam 102. With this arrangement, the lower spindle is allowed to have sufficient freedom of movement vertically, so that, for example, a cut-off switch (not shown) can be actuated by pin 104 to disconnect the electrical circuits when the last record has been transferred from the spindle to the turntable. Conveniently, the movements of the spindle components may be considered with respect to the position of the lower spindle 76.

To move the actuating rod 18 vertically in accordance with the horizontal position of the master cam 102, an actuating pin 108 extends transversely through holes 112 in the lower end of the actuating rod 18 and through an enlarged slot 114 in the master cam.

To reset the trigger mechanism, an arm reset pin 116 is provided which extends transversely through the lower end of the arm-reset sleeve 88, and through a slot 118 in the master cam 102.

In operation, the cycle may be considered to start with the spindle components in the positions shown in Figs. 1 and 6. The actuating rod 18, controlled by the actuating pin 108 and the cam slot 114, is in its lowermost position and the rubber gripping ring 12, accordingly, is in its contracted condition; the stack of records 2 being supported by the arms 4 which are in the extended position. The arm-reset pin 116 which, with the cam slot 118, controls the movement of the arm-reset sleeve 88, is in its uppermost position.

When a record is to be placed on the surface of the turntable, the master cam 102 is moved from the position shown in Fig. 6 to that shown in Fig. 7. During the first portion of the cam movement the arm-reset pin 116 does not move vertically but the actuating rod immediately starts its upward movement as the actuating pin 108 traverses the cam surface 122. During the continued upward movement of the actuating rod, the sloping portion 124 of the lower cam slot 118 causes the arm-reset sleeve 88 to move to its lower position. At the point in the cam movement when the arm-reset sleeve 88 has been moved to its lower position and the rubber gripping ring 12 has been expanded by the co-action of the actuating rod 18 and the expander pins 14, so that the record stack, except for the lowermost record, is supported by the rubber gripping ring 12, the slope of the lower cam surface of the expanded slot 114 is increased, as at 126, in order to localize the point of triggering. It is during the time that the actuating pin 108 is traversing this surface that the groove 84 in the actuating rod 18 is moved adjacent the balls 78 so that the internal chamfer 86 on the lower end of the trigger ring 52 forces the balls 78 into the groove 84 causing rapid downward movement of the trigger ring 52 to lower and retract the record supporting arms and to permit the lowermost record to fall freely upon the surface of the turntable 8. This completes the first portion of the operating cycle.

The cam is then moved laterally in the opposite direction to its initial position. However, the actuating pin 108 does not reverse its previous path of travel because it follows the upper surface of the expanded cam slot 114; downward movement of rod 18 being prevented by the balls 78. Thus, during the return movement the actuating pin 108 travels along the upper surface of the slot, causing the rubber gripping ring 12 to remain expanded until the return movement of the cam has caused the arm-reset sleeve 88 to move upwardly to the position shown in Fig. 6 so that the balls 78 may be pushed out of the circular groove 84 by downward movement of the actuating rod 18, which is accomplished near the end of the cycle by the sloping surface indicated at 128. With this arrangement the compressive force of the spring is transferred from the arm-reset sleeve 88 to the balls 78 so that there is no subsequent lost motion when the arm-reset sleeve moves downwardly to allow room for the trigger ring. Continuing, downward movement of the actuating rod 18 releases the record stack allowing them to move gently downwardly to rest upon the record supporting arms 4. The entire mechanism is now ready to repeat the cycle when the operating mechanism of the record player again actuates the master cam 102.

In order to permit the most convenient removal of the records 2 from the turntable 8 the record support arms 4 are provided with sufficient clearance that they may be closed manually by merely exerting sufficient force to overcome the pressure exerted by the curved end portions 66 of the spring levers 64. Thus, it is only necessary to lift the stack of records directly upward, and as the outer surfaces of the arms 4, which are contoured to be substantially complementary to the inner surface of the holes in the records, make contact with the walls of the holes, the arms will be forced to a closed position so that the records may be removed without difficult mechanical or manual manipulation.

Various advantages and useful features of the embodiment described above have been particularly pointed out, others will be apparent from an examination of the working parts, and still others will be fully appreciated only by actual operation of a record changer constructed in accordance with these principles. For example, the vertical distance between the lower end of the gripping ring 52 and the upper ends of the record supporting arms 4 may be adjusted so that a record of average thickness in position upon the arms 4 will not be gripped, or will be barely gripped, by the ring 52. In any case the gripping force is not sufficiently great but that the record will fall freely when the arms 4 are removed.

With thinner records the ring 52 will exert no gripping force on the record supported by the arms, but will support firmly the record next above it. With thick records the ring 52 may exert more gripping force on the record which is supported by the arms.

However, because of the greater weight of the thick record, the gripping force will not be sufficient to prevent the record from dropping when the arms 4 are removed. Thus, the variation in weight of the records in accordance with their thickness provides a compensation feature that enables the changer to handle successfully records which vary in thickness by a ratio of two to one, or more.

Certain other features of this embodiment are for the purpose of facilitating production, assembly and adjustment. Thus, the trigger ring 52 and the arm-carrier sleeve 46 are joined by the threaded section 48, so that the distance between the arms 4 and the ring 52 may be adjusted to best advantage, thus, increasing the allowable production tolerances. Many of the parts are such that readily obtainable stock materials such as tubing, drill rod, etc., may be utilized with minimum forming or machining operations. In addition, the entire unit may be taken apart or assembled rapidly, thus decreasing initial production costs and rendering easy the replacement of worn or broken parts.

The above description is directed to a preferred embodiment of the invention, but it is to be understood that this is not intended to be exhaustive nor limiting of the invention, but is described, in accordance with the statutes, as an illustration so that others skilled in the arts can modify it as may be suited to the conditions of a particular use. For example, in some applications it may be desirable to replace certain of the vertical motions with rotary movement. Thus the rubber may be expanded by means of a rotating element having vertically directed cam surfaces which, as the element is rotated, move the expander pins radially, to cause the gripping ring alternately to grip and to release the record stack.

I claim:

1. In an automatic phonograph record changer, an arrangement for supporting a plurality of records and for releasing successively the individual records, said changer comprising a driving member for actuating said record changing arrangement, a deformable member for supporting a plurality of records, a control assembly under the control of said driving member for altering the shape of said deformable member to support or release said records, a plurality of movable arms for supporting a record released by said deformable member, and a control mechanism for moving said arms downwardly and removing said arms from the path of said record, said mechanism comprising an arm-carrier sleeve connected to said arms and mounted for vertical movement, a spring connected to said arm-carrier sleeve, a lock normally maintaining said spring under stress, means under control of said driving member for releasing said lock to cause said spring to accelerate said arm-carrier sleeve and said arms downwardly, and a reset member under control of said driving member for resetting said spring to its stressed condition, and means responsive to the downward movement of said arms for moving said arms out of the path of said record.

2. In a phonograph, an automatic disc feed for holding a stack of record discs and releasing them individually and successively to permit them to fall upon a turntable, said automatic feed comprising a vertical supporting shaft extending above and coaxial with said turntable and having an expansible portion including a rubber sleeve having a vertical length at least equal to the thickness of a plurality of said discs and with its lower end at a distance above said turntable greater than the height of the entire stack of said discs, the effective diameter of said expansible portion when retracted being less than that of the center holes of said discs and expansible to a diameter greater than that of said center holes, a plurality of retractible arms normally extending outwardly from said shaft, the upper ends of said arms being spaced below the lower end of said expansible portion a distance approximately equal to the thickness of one disc, said arms being retractible downwardly and inwardly into the cylindrical path described by the center holes of said discs when released from said stack and falling freely to said turntable, means within the said cylindrical path for moving said arms downwardly and subsequently retracting them into said path, a plurality of horizontally spaced expander members positioned within said rubber sleeve, a cam for moving said members radially outwardly to produce thereby radial expansion of said sleeve, and interconnected means for actuating said cam to hold said sleeve expanded when said arms are in their retracted positions and to release said expansible portion only when said arms are in their extended positions.

3. In a phonograph, an automatic disc feed for holding a stack of record discs and releasing them individually and successively to permit them to fall upon a turntable, said automatic feed comprising a vertical supporting shaft extending above and coaxial with said turntable and having an expansible portion including a sleeve of resilient material having circumferentially alternate thick and thin wall sections and having a vertical length at least equal to the thickness of a plurality of said discs and with its lower end at a distance above said turntable greater than the height of the entire stack of said discs, the effective diameter of said sleeve when retracted being less than that of the center holes of said discs and expansible to a diameter greater than that of said center holes, a plurality of retractible arms normally extending outwardly from said shaft, the upper ends of said arms being spaced below the lower end of said expansible portion a distance approximately equal to the thickness of one disc, said arms being retractible downwardly and inwardly into the cylindrical path described by the center holes of said discs when released from said stack and falling freely to said turntable, means within the said cylindrical path for moving said arms downwardly and subsequently retracting them into said path, a plurality of horizontally spaced expander pins positioned vertically within said sleeve, each of said pins being positioned adjacent a thick wall section of said sleeve, a cam for simultaneously moving said pins radially outwardly to produce thereby radial expansion of said sleeve, and interconnected means for actuating said cam to hold said sleeve expanded when said arms are in their retracted positions and to release said sleeve only when said arms are in their extended positions.

4. In a phonograph, an automatic disc feed for holding a stack of record discs and releasing them individually and successively to permit them to fall upon a turntable, said automatic feed comprising a vertical supporting shaft extending above and coaxial with said turntable and having an expansible portion with a vertical length at least equal to the thickness of a plurality of said discs and with its lower end at a distance above said turntable greater than the height of the entire stack of said discs, the effective diameter of said expansible portion when retracted being less than that of the center holes of said discs and expansible to a diameter greater than that of said center holes, a plurality of retractible arms normally extending outwardly from said shaft, the upper ends of said arms being spaced below the lower end of said expansible portion a distance approximately equal to the thickness of one disc and spaced radially outwardly from said shaft and arranged to support a record by making contact with the record only at points spaced from the edges formed by said center holes, said arms being retractible downwardly and inwardly into the cylindrical path described by the center holes of said discs when released from said stack and falling freely to said turntable, means within said cylindrical path for retracting said arms including a vertically movable arm-carrier sleeve pivotally joined to said arms and extending downwardly therefrom, means comprising a spring and a trigger lock for said spring for rapidly accelerating said arm-carrier sleeve downwardly when said trigger lock is released, and a cam surface for directing the movement of said arms radially inwardly after said arms have been pulled downwardly a predetermined distance by said arm-carrier sleeve, separate means for controlling the expansion of said expansible portion, and interconnected means for actuating said expansion control means to hold said expansible portion expanded when said arms are in their retracted positions and to release said expansible portion only when said arms are in their extended positions.

5. In a phonograph, an automatic disc feed for holding a stack of record discs and releasing them individually and successively to permit them to fall upon a turntable, said automatic feed comprising a vertical supporting shaft extending above and coaxial with said turntable and having an expansible portion with a vertical length at least equal to the thickness of a plurality of said discs and with its lower end at a distance above said turntable greater than the height of the entire stack of said discs, the effetcive diameter of said expansible portion when retracted being less than that of the center holes of said discs and expansible to a diameter greater than that of said center holes, a plurality of retractible arms normally extending outwardly from said shaft, the upper ends of said arms being spaced below the lower end of said expansible portion a distance approximately equal to the thickness of one disc and spaced radially outwardly from said shaft so as to support a record by making contact with the record at points spaced from the edges formed by said center holes, said arms being retractible downwardly and inwardly into the cylindrical path described by the center holes of said discs when released from said stack and falling freely to said turntable, means within said cylindrical path for retracting said arms including a vertically movable arm-carrier sleeve pivotally joined to said arms and extending downwardly therefrom, means comprising a spring and a trigger lock for said spring for rapidly accelerating said arm-carrier sleeve downwardly when said trigger is released, said trigger lock comprising radially movable balls having first and second positions for holding and releasing, respectively, said spring, a vertically movable arm-reset sleeve for compressing said spring and moving said balls to said first position, and a cam surface for directing the movement of said arms radially inwardly after said arms have been pulled downwardly a predetermined distance by said arm-carrier sleeve, separate means for controlling the expansion of said expansible portion, and interconnected means for actuating said expansion control means to hold said portion expanded when said arms are in their retracted positions and to release said expansible portion only when said arms are in their extended positions.

6. In an automatic phonograph record changer for supporting a plurality of records and successively releasing the individual records, the combination comprising a spindle, a plurality of movable supports connected to said spindle and for supporting a record, a normally restrained spring operated mechanism arranged upon release to move said supports away from said record with an acceleration having a downward component exceeding the gravitational acceleration of said released record, said mechanism including means for thereafter removing said supports from the path of said record, and a trigger controlled device, said device being operative to release said spring operated mechanism.

GEORGE H. LEONARD.

REFERENCES CITED

The following references are of record in the file of this patent:

UNITED STATES PATENTS

| Number | Name | Date |
|---|---|---|
| 2,287,098 | Habegger | June 23, 1942 |

FOREIGN PATENTS

| Number | Country | Date |
|---|---|---|
| 822,026 | France | Dec. 18, 1937 |
| 55,603 | Holland | Oct. 16, 1943 |
| 62,695 | Denmark | Sept. 18, 1944 |
| 64,302 | Denmark | Feb. 18, 1946 |
| 600,466 | Great Britain | Apr. 9, 1948 |